United States Patent [19]

Chatelain

[11] 4,316,308
[45] Feb. 23, 1982

[54] RETAINING AND STRETCHING ELEMENT FOR A FILM SUPPORTING FRAMEWORK

[75] Inventor: Michel Chatelain, Annecy, France

[73] Assignee: Brave Trading Limited, Douglas, Isle of Man

[21] Appl. No.: 100,803

[22] Filed: Dec. 6, 1979

Related U.S. Application Data

[63] Continuation of Ser. No. 886,713, Mar. 15, 1978, abandoned.

[30] Foreign Application Priority Data

Mar. 28, 1977 [FR] France .................................. 7710676

[51] Int. Cl.³ .............................................. A44B 21/00
[52] U.S. Cl. ...................................... 24/335; 160/392
[58] Field of Search .............. 24/81 R, 81 FC, 243 K; 52/222, 273; 160/392–397, 327

[56] References Cited

U.S. PATENT DOCUMENTS

| 1,758,720 | 5/1930 | Sodergren | 160/392 |
| 2,897,889 | 8/1959 | Kessler | 160/392 |
| 3,961,661 | 6/1976 | Tombu | 160/392 |
| 3,987,835 | 10/1976 | Bloomfield | 160/392 |

FOREIGN PATENT DOCUMENTS 805953 6/1961 Fed. Rep. of Germany ... 24/243 K

Primary Examiner—Kenneth Dorner
Attorney, Agent, or Firm—Griffin, Branigan & Butler

[57] ABSTRACT

A film retaining and tensioning element is provided in which the film passes between a pair of facing channel members adapted to be embedded one within the other and having complementary sinuous profiles whereby the inner channel pivots on the outer during assembly and progressively pinches and stretches the film. As tension on the film increases the locking effect further increases.

9 Claims, 2 Drawing Figures 4,316,308

RETAINING AND STRETCHING ELEMENT FOR A FILM SUPPORTING FRAMEWORK

This is a continuation of application Ser. No. 886,713, filed Mar. 15, 1978, now abandoned.

BACKGROUND OF THE INVENTION

This invention comprises retaining and tensioning means for a film. Although not intended to be limited thereto, the invention is particularly adapted to tensioning a film of plastic material which may form the external surface of a planar solar captor for obtaining the greenhouse effect.

In numerous applications it is necessary to be able to stretch easily a thin film, for example a plastic film, over a large surface. Such is the case with exterior films used in planar solar captors employing a framework formed from profiled members.

The known arrangements enabling stretching of a plastic film within a framework have not been entirely satisfactory being relatively complex and difficult to apply.

This invention seeks to overcome such difficulties through providing a simple means which permits the easy placing of a film under heavy tension.

SUMMARY OF THE INVENTION

To this end the invention provides a retaining and tensioning element for a thin planar film including at least one elongated channel portion provided with first and second flanks joined by a first core member, the first flank exhibiting a cross-section of sinuous internal profile, an elongated inverted channel member provided with third and fourth flanks joined by a second core member said third flank exhibiting a cross-section of sinuous external profile complementary to the internal profile of said first flank, said inverted channel member being dimensioned to be received within said channel portion, the film being received between said flanks of said channel portion and said inverted channel member and being pinched and progressively tensioned during assembly of said channel member with said channel portion.

Preferably the channel portion and member are matched in such a manner that an initial tension on the film partially engages the channel member in an inclined position in its transversal sense within the channel portion, following which the channel member is pivoted relative to one flank of the channel portion which forms a knuckle, such pivoting motion bringing about an increase in the film tension and at the end of the pivoting motion when the channel member is totally inset within the channel portion achieves locking of the film.

This retaining and tensioning means has the advantage that when the channels are properly assembled disengagement thereof under the effect of a heavy tension exerted on the film becomes impossible.

DETAILED DESCRIPTION

Figure 1:
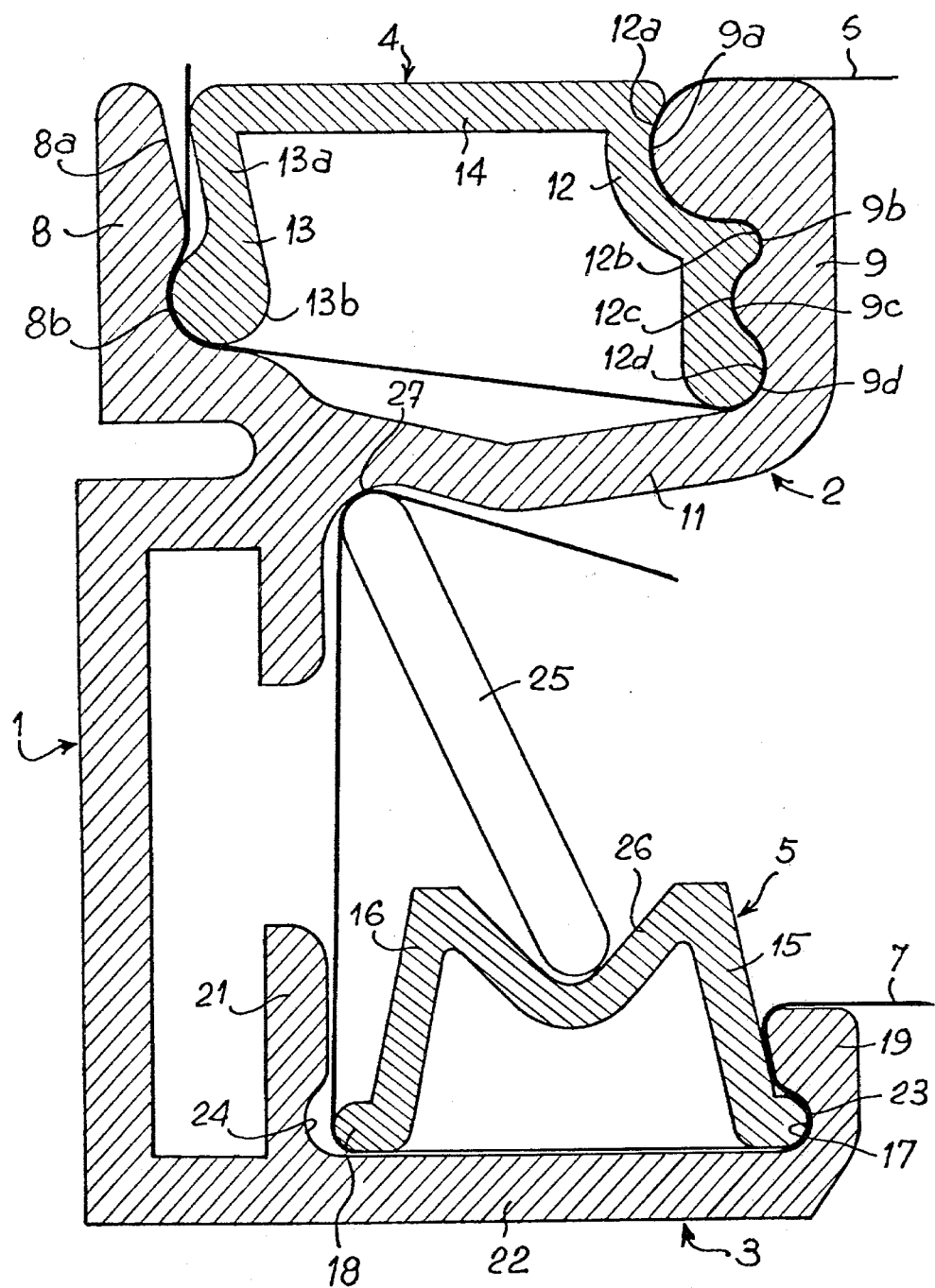
FIG. 1 is a cross-sectional view of a composite profiled element according to the invention in assembled form.
Figure 2:
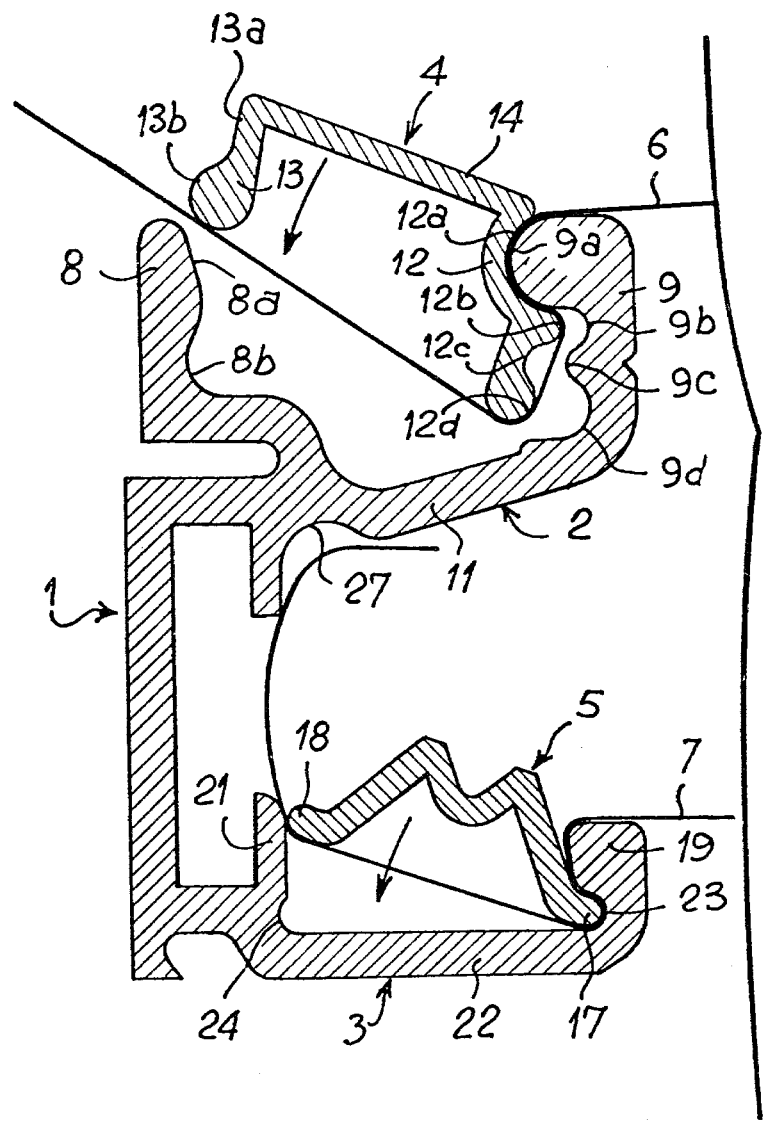
FIG. 2 is a cross-section similar to that of FIG. 1 showing the components in the course of assembly.

On FIGS. 1 and 2 is shown in cross-section a composite profiled element 1 which comprises effectively two channels forming part of two fastening and tensioning means according to the invention, namely an upper channel 2 and a lower channel 3. With these two channels there will cooperate respectively an upper inverted channel 4 and a lower inverted channel 5 in order to assure the retaining and tensioning of upper and lower films 6 and 7 respectively. These two films may form a portion of a planar solar captor for achieving a greenhouse effect.

The upper channel 2 has generally a cross-section in the form of a U open at the top. However the interior profile of this U section is relatively sinuous. Channel 2 comprises an external vertical flank 8, an internal vertical flank 9 and a lower core member 11 uniting the two flanks. The internal flank 9 exhibits successively from top to bottom at the interior of channel 2 a first upper rib portion 9a projecting towards the interior and exhibiting a cross-section more or less semi-circular, a second portion forming a groove 9b having a curved cross-section of smaller radius than the first portion 9a, a third portion forming a rib 9c inset relative to the first rib portion 9a and finally a fourth portion comprising a groove 9d proximate the lower core member 11.

The exterior flank 8 of the upper channel 2 is shorter than the interior flank 9, its upper extremity being nevertheless at the same level as the upper extremity of the interior flank 9 over which passes the upper film 6. The exterior flank 8 exhibits from top to bottom initially a portion 8a comprising an insertion ramp lightly inclined towards the interior and is followed by a second portion comprising a groove 8b proximate the lower core member 11.

The upper inverted channel 4 exhibits a cross-section generally in the form of an inverted U and comprises an interior flank 12, an exterior flank 13 and an upper horizontal core member 14 uniting the two flanks 12 and 13.

The forms of flanks 12 and 13 of the upper inverted channel 4 are adapted to the internal profiles of flanks 8 and 9 of the upper channel 2. Thus the interior flank 12 of inverted channel 4 shows successively from top to bottom on its outer surface a first portion 12a defining a groove having as cross-section the same radius of curvature as the projecting rib 9a. Then below this groove is a second portion comprising a rib 12b of curved cross-section having a radius of curvature equal to that of groove 9b, the rib 12b projecting outwardly relative to the upper groove 12a, a third portion comprising a groove 12c adapted to accommodate rib 9c and finally an extreme lower portion of rounded cross-section 12d adapted to be lodged within groove 9d.

The exterior flank 13 of the upper inverted channel 4 extends downwardly and is lightly sloped towards the interior having its upper portion 13a when assembled parallel to the inclined insertion ramp 8a of the outer flank 8. At its lower portion flank 13 exhibits an outwardly extending locking rib 13b which may be engaged within groove 8b since conforming to the profile of said groove.

From FIG. 1 may be seen the manner in which the upper film 6 is kept stretched. This film passes successively between flanks 12 and 9 from top to bottom and follows a sinuous path between the various ribs and grooves between which it is pinched and locked. Thereafter it extends transversally in the bottom of channel portion 2 in order to pass eventually between locking rib 13b of flank 13 and groove 8b and finally being pinched at this location. The end portion of the film 6 subsequently passes upwardly and extends freely between the upper portions 8a and 13a of flanks 8 and 13.

FIG. 2 shows the manner in which the upper film 6 is retained and tensioned. Initially film 6 is given a predetermined preliminary tensioning by having it pass over the lower extremity of the two flanks 12 and 13 of the inverted channel member 4 and is thereafter placed over the upper rib 9a of the flank 9 of channel portion 2. The upper inverted channel member 4 is then engaged in a transversally inclined position, groove 12a of flank 12 being placed on the rib 9a which acts as a knuckle. At this moment the film is pinched, being already lightly stretched between the rib 9a and groove 12a. Outside of this pinching zone the remainder of the film is relatively free.

In order to complete the assembly of channel member 4 within channel portion 2, channel member 4 is transversally pivoted on rib 9a in a counter clockwise sense. Tension is produced in the film since it is forced to slide in passing over the surface of the rib 9a. At the end of the pivoting motion the two ribs 12b and 12d will be locked into the bottom of the respective grooves 9b and 9d in a manner such that the film 6 is pinched between flanks 9 and 12 and follows a sinuous and staggered path.

During the pivoting motion, exterior flank 13 of inverted channel member 4 slides initially along the insertion ramp 8a with locking rib 13b serving as a bearing until this latter is engaged and locked in the bottom of the lower groove 8b.

During the sliding motion of locking rib 13b film 6 is pinched at one place only, i.e. along the contact point of locking rib 13b with the insertion ramp 8a, this further assuring fastening of the film.

As soon as the inverted channel member is completely locked into the channel portion 2, it is impossible for it to be forced out by tension applied to film 6. It may be seen effectively that rib 12b of flank 12 placed within groove 9b forms a positive abutment preventing unwanted disengagement of inverted channel member 4.

The retaining arrangement for the lower film 8 utilizes a lower channel portion 3 having a cross-section generally in the form of a U open towards the top and an inverted channel member 5 having a cross-section generally in the form of an M, in which the two external flanks 15 and 16 diverge slightly towards the bottom and are terminated at their lower extremities by ribs 17 and 18 extending horizontally and projecting towards the exterior.

The lower channel portion 3 comprises two vertical flanks extending upwardly, namely an inner flank 19 and an outer flank 21, these being united on their lower portions by a horizontal core member 22. Within the lower internal angles where flanks 19 and 21 unite with core 22, there are provided respectively grooves 23 and 24 which extend opposite ribs 17 and 18 of the M-formed channel member 5 and exhibit in cross-section the same radius of curvature.

It will be seen on FIG. 1 that when the M-formed channel member 5 is locked into the lower channel portion 3 the film 7 passes and is locked between the internal flank 15 of M-formed channel 5 and the internal surface of profile 19 which has about the same slope as flank 15 which is to say it is inclined from top to bottom and from the interior towards the exterior of lower channel portion 3. Film 7 thereafter passes between rib 17 and groove 23, than horizontally along the lower core member 22, finally passing around the rib 18 and exiting upwardly.

The maintenance of M-formed channel 5 within lower channel portion 3 is assured by elastic members 25 which are sloped from top to bottom and from the exterior towards the interior of profiled element 1. Each elastic member 25 is supported on the one hand within the V hollow of upper surface 26 of M-formed channel member 5 and on the other hand on a curved supporting surface 27 provided in the composite profiled element 1 and more particularly in the lower surface of the core member 11 of the upper channel portion 2. The elastic member 25 constitutes a brace which maintains the M-formed channel member 5 firmly within the lower channel portion 3 and prevents it from popping out of this latter.

The end portion of lower film 7 is preferably squeezed between the elastic element 25 and the supporting surface 27 as shown on FIG. 1.

FIG. 2 illustrates the manner in which the lower film 7 is retained and tensioned between the two channels 5 and 3. Initially this film 7 is pre-stretched by passing over the upper face and the internal inclined face of the internal flank 19 then between rib 17 and groove 23. The M-formed channel member 5 is engaged in the lower channel portion 3 by being transversally inclined in a manner such that rib 17 may be well engaged within groove 23. The remainder of the film extends across the core 22 and is pinched along the line of contact between rib 18 of the external flank 16 and the internal vertical surface of the external flank 21 of the lower channel portion 3.

Following this operation when channel 5 is forced to the bottom of the channel portion 3 film 7 is solidly pinched and locked between flanks 15 and 19 through following a relatively sinuous path. Finally, additional locking of this film is assured when the elastic element 25 is put into its place, assuring a firm engagement of M-formed channel member 5 as well as pinching of film 7 between the elastic element 25 and the supporting surface 27.

There additionally is produced an increase in the tension of film 7 when channel member 5 is engaged within channel portion 3 through a pivoting movement about the joint formed by rib 17 engaged within groove 23. It follows from the preceding description that the retaining means for the upper and lower films are obtained in a different manner. The particular arrangement of the lower retaining means comprising two channels 3 and 5 as shown enables a considerable space saving. Furthermore, the fact that the end margin of the lower film 7 is brought up from rib 18 to be pinched between elastic element 25 and the supporting surface 27 enables the creation of a continuous sheath along the composite profiled element 1 thus improving the insulation of the entire framework formed by profiled element 1.

We claim:

1. Retaining and tensioning element for a thin planar film including at least one elongated channel portion having a generally U-shaped cross-section provided with first and second flanks joined by a first core member, the first flank exhibiting a cross-section of sinuous internal profile, an elongated inverted channel member having a generally U-shaped cross-section provided with third and fourth flanks joined by a second core member, said core member having a bottom surface on the inside of said U-shaped inverted channel member, said third flank exhibiting a cross-section of sinuous external profile complementary to the internal profile of said first flank, said inverted channel member being dimensioned to be received within said channel portion, the film being respectively received and pinched between said first and third and second and fourth flanks upon assembly of said inverted channel member with said channel portion, wherein the internal profile of said first flank provides a rounded inwardly-projecting rib means proximate the open side of said channel portion for forming a first rounded knuckle surface means and the external profile of said third flank provides a groove means proximate said second core member for forming a second rounded knuckle surface means complementary in shape to said first rounded knuckle surface means for sliding on film extending across said first rounded knuckle surface means and thereby pivoting said channel member thereon during assembly of said channel members to pinch said film therebetween, and wherein said second flank exhibits a cross-section of internal profile which includes an insertion ramp sloping inwardly from the open side of said U-shaped channel portion followed by a curved locking groove projecting outwardly proximate said first core member and said fourth flank exhibits a cross-section of external profile which includes an elongated portion extending laterally away from said second core member, said elongated portion having a relatively flat outer surface, but including, formed at the outer end thereof, proximate the open side of said inverted channel member, a locking-rib means protruding outwardly from said relatively-flat outer surface of said fourth flank, said locking rib being substantially laterally spaced from the bottom surface of said second core a distance at least as great as the thickness of the second core, said locking-rib means and said locking groove having approximately complementary curved surfaces, and said locking-rib means having the function of pinching said film between its surface and said insertion ramp during assembly of said channel members, and between its surface and said locking-groove surface once said channel members are assembled, wherein when said channel portion and said inverted channel member are fully engaged, with ends of said core of said inverted channel member being in an approximately horizontal attitude, said knuckle surface means of said inverted channel member is above the locking-rib means of said inverted channel member, with said knuckle surface means being proximate said core of said inverted channel, but said locking-rib means being substantially spaced from said core.

2. Retaining and tensioning element as set forth in claim 1 wherein said thin planar film is of plastic material as used in a solar captor for achieving a greenhouse effect.

3. Retaining and tensioning element as set forth in claim 1 wherein said fourth flank is substantially parallel to said insertion ramp when said assembly is complete.

4. Retaining and tensioning element as in claim 1 wherein said insertion ramp has a substantially straight surface.

5. Retaining and tensioning element for a thin planar film including at least one elongated channel portion provided with first and second flanks joined by a first core member, the first flank exhibiting a cross-section of a sinuous internal profile, an elongated inverted channel member provided with third and fourth flanks joined by a second core member said third flank exhibiting a cross-section of sinuous external profile complementary to the internal profile of said first flank, said inverted channel member being dimensioned to be received within said channel portion, the film being received between said flanks of said channel portion and said inverted channel member and being pinched and progressively tensioned during assembly of said channel member with said channel portion;

wherein the internal profile of said first flank provides a rounded inwardly projecting rib proximate the open side of said channel portion and the external profile of said third flank provides a groove of cross-section complementary to said rib proximate said second core member, said rib and said groove cooperating to form a knuckle around which said channel member may pivot during assembly with said channel portion; and, wherein the internal profile of said first flank further provides at least one further rib and two grooves between the first-mentioned rib and the first core section and the external profile of said third flank further provides at least one further groove and two ribs between the first-mentioned groove and the open side of said channel member, said further rib and grooves of said first flank being complementary to said further groove.

6. Retaining and tensioning element for a thin planar film including at least one elongated channel portion provided with first and second flanks joined by a first core member, the first flank exhibiting a cross-section of sinuous internal profile, an elongated inverted channel member provided with third and fourth flanks joined by a second core member said third flank exhibiting a cross-section of sinuous external profile complementary to the internal profile of said first flank, said inverted channel member being dimensioned to be received within said channel portion, the film being received between said flanks of said channel portion and said inverted channel member and being pinched and progressively tensioned during assembly of said channel member with said channel portion;

said retaining and tensioning element including a further elongated channel portion provided with fifth and sixth flanks joined by a third core member said fifth and sixth flanks each exhibiting a cross-section of internal profile including a locking groove proximate said third core member and a further elongated inverted channel member having a cross-section in the form of an M dimensioned to be received within said further channel portion, the flanks of said further M-formed channel member being provided at their outer extremities with outwardly projecting locking ribs adapted to be assembled into said locking grooves proximate said third core member.

7. Retaining and tensioning element as set forth in claim 6 wherein the internal profile of said fifth flank is lightly inclined towards the open side of said further channel portion so as to be substantially parallel to the adjacent flank of said M-formed channel member when assembled therewith.

8. Retaining and tensioning element as set forth in claim 6 wherein an elastic bracing member is placed between the further M-formed channel member and a groove provided on the exterior surface of the first core member thereby to assure retention of said M-formed channel member within said further channel portion.

9. Retaining and tensioning element as set forth in claim 8 wherein an additional film is received between the flanks of said further channel portion and said M-formed channel member and receives a supplemental locking effect by passing between said bracing member and the groove on the exterior surface of said first core member.

* * * * *